(12) United States Patent
de Greef

(10) Patent No.: US 10,255,835 B2
(45) Date of Patent: Apr. 9, 2019

(54) LUMINANCE AND REDUCING POWER CONSUMPTION IN ELECTROWETTING DISPLAYS

(71) Applicant: Amazon Technologies, Inc., Seattle, WA (US)

(72) Inventor: Petrus Maria de Greef, Waalre (NL)

(73) Assignee: Amazon Technologies, Inc., Seattle, WA (US)

( * ) Notice: Subject to any disclaimer, the term of this patent is extended or adjusted under 35 U.S.C. 154(b) by 757 days.

(21) Appl. No.: 14/867,727

(22) Filed: Sep. 28, 2015

(65) Prior Publication Data

US 2017/0092173 A1 Mar. 30, 2017

(51) Int. Cl.
*G09G 3/34* (2006.01)
*G09G 3/20* (2006.01)
*G02B 26/00* (2006.01)

(52) U.S. Cl.
CPC ......... *G09G 3/2003* (2013.01); *G02B 26/005* (2013.01); *G09G 3/348* (2013.01); *G09G 2320/0252* (2013.01); *G09G 2320/0626* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 2011/0254826 A1* | 10/2011 | Umezaki | ................ | G09G 3/344 345/212 |
| 2013/0127817 A1* | 5/2013 | Hwang | .................. | G09G 3/001 345/212 |
| 2014/0160554 A1 | 6/2014 | Wang et al. | | |

OTHER PUBLICATIONS

PCT Search Report and Written Opinion dated Dec. 2, 2016 for PCT Application PCT/US16/53572, 13 pages.

* cited by examiner

*Primary Examiner* — Jennifer Mehmood
*Assistant Examiner* — Parul H Gupta
(74) *Attorney, Agent, or Firm* — EIP US LLP

(57) ABSTRACT

Subject matter disclosed herein relates to increasing luminance and reducing power consumption in electrowetting display devices. The electrowetting display comprises a plurality of electrowetting elements that are driven by a driving voltage that comprises a first voltage and a common voltage. A common electrode provides the common voltage. A timing controller is provided to drive the electrowetting elements. The timing controller controls the common electrode to increase an amplitude of the common voltage to thereby increase luminance of the electrowetting display during driving of the electrowetting elements.

20 Claims, 8 Drawing Sheets

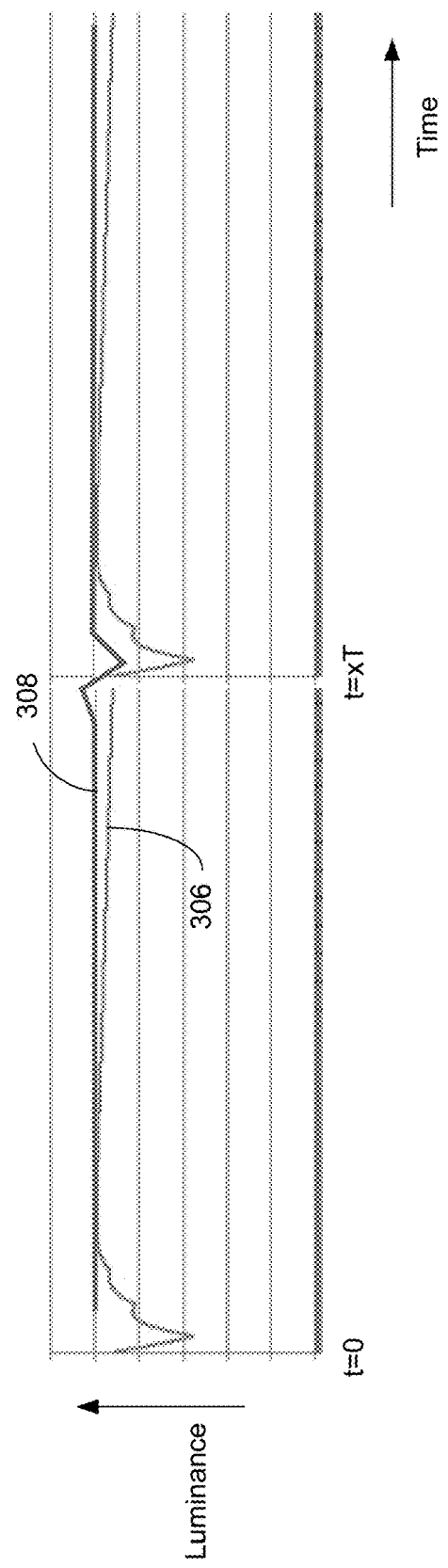

LUMINANCE AND REDUCING POWER CONSUMPTION IN ELECTROWETTING DISPLAYS

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. In EWD applications, an addressing scheme is utilized to drive the pixels of the EWD. Generally, one of the points of emphasis for EWD applications is low power design since in today's applications, EWDs are intended to be used in mobile and portable media devices.

An input video-stream generally represents a sequence of pixels or subpixels, grouped per line; a sequence of lines, grouped per frame; and a sequence of frames defining a moving video stream (movie). When such a video stream is to be reproduced on an active matrix EWD, a timing controller and display drivers are used to transfer the video data towards the actual pixels of the EWD. A specific addressing scheme is used by the timing controller to timely control row and column drivers of the EWD. The purpose of an addressing scheme is to set (or maintain) the state of a pixel or subpixel in an EWD. The addressing scheme drives an active matrix array or TFT array and provides analog voltages to individual pixels or subpixels of the EWD. These voltages modulate the luminance transmission and/or reflectivity of the pixels or subpixels of the EWD. The pixels or subpixels may be grouped per row and when a row is addressed, voltages of a complete row are stored as charge on corresponding pixel or subpixel capacitors. As the video-data is repeatedly updated, still and moving images can be reproduced by the EWD.

Each address cycle consumes an amount of energy. Furthermore, leakage of the pixel or subpixel capacitors (e.g. current through active matrix switches and dielectric materials) causes a reduction in transmission/reflectivity. Additionally, backflow of electrowetting fluids of the EWD is another cause of reducing transmission/reflectivity. Reset pulses used in EWDs also cause a temporary reduction of transmission/reflectivity. The temporary reduction of transmission/reflectivity is observed as a reduction in luminance.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

FIG. 3B is a diagram illustrating the effect on luminance of electrowetting elements based upon the example of providing the compensation voltage to electrowetting elements illustrated in FIG. 3A, according to some embodiments.

DETAILED DESCRIPTION

Figure 1A:
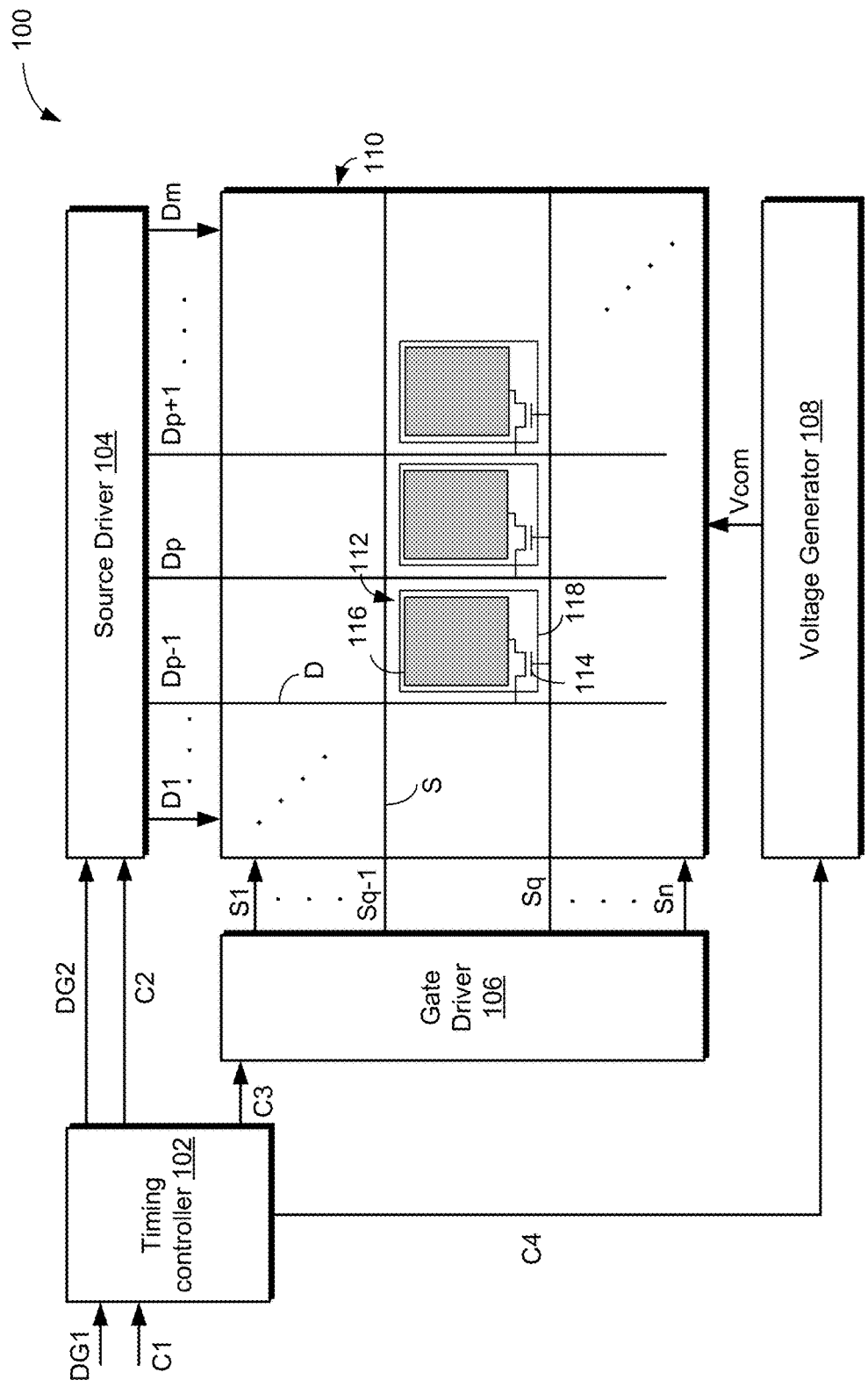
FIG. 1A is a schematic view of an example of an electrowetting display, according to various embodiments.

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for operating electronic devices including these components for the electrowetting displays and other features described herein. More particularly, various embodiments provide techniques that provide for improved luminance and reduced power consumption in electrowetting displays.

In some embodiments, an electrowetting display includes a first support plate and a second support plate and a plurality of electrowetting elements therebetween. The electrowetting elements generally represent pixels and/or subpixels, which make up pixels. Individual electrowetting elements may include one or more hydrophobic layers or surfaces on the first support plate, a first fluid, and a second fluid at least partially surrounding the first fluid. For example, the first fluid may be an oil and the second fluid may be an electrolyte solution. A hydrophobic layer may comprise a hydrophobic amorphous fluoropolymer (AF1600®), for example. Herein, the term "hydrophobic" is used to describe a material or layer that is hydrophobic relative to other materials or layers. For example, a hydrophobic layer need not be 100% hydrophobic, though the hydrophobicity of the layer may be relatively high. Hydrophobicity of a "hydrophobic material" or "hydrophobic layer" may change under various circumstances or conditions. While each electrowetting element may include a first electrode (e.g., a pixel electrode) disposed on the first support plate, a second electrode (e.g., a common electrode), which may (or may not) be disposed on the second support plate, may overlay a plurality of the electrowetting elements. Herein, "disposed on" includes the possibility of intermediate layers (e.g., "disposed on" need not mean "directly on").

Generally, a reset pulse may be applied to the electrowetting elements to reduce adverse effects on the quality (e.g., luminance, brightness, contrast ratio, and so on) of an image displayed by the electrowetting elements resulting from backflow of the electrowetting oil. For example, such backflow can reduce the stability of a display state during a display period which, for example, is the period during which a desired first display state is to be maintained. Here, the first display state corresponds to a first fluid (e.g., electrowetting oil) being contracted or partially contracted to allow light to transmit through (or reflect from) the electrowetting element. Even though a first signal level corresponding to the first display state is applied to the electrowetting element during this period, the contracted or partially contracted first fluid tends to flow back to form a layer over an electrode layer that includes the first electrode of the electrowetting element, as in the case of an inactive state that prevents light from transmitting through (or reflecting from) the electrowetting element. The rate of backflow depends, at least in part, on the properties of the first fluid. Backflow leads to an undesirable change in the display state of the electrowetting element and, consequently, a reduced quality of the image of the display device.

The application of a reset pulse during the display period of the first display state resets the electrowetting element to counteract backflow. Since the reset pulse may affect the instantaneous display state of an electrowetting element, the duration of the reset pulse is relatively short compared to the duration of the first signal level corresponding to the first display state. For example, the reset pulse may have a duration short enough so as to not be noticeable to a viewer of the display device. For a particular example, the duration of a reset pulse may be about 1 millisecond with a duty cycle of about 5%, though claimed subject matter is not so limited. As an example, a driving voltage for the electrowetting elements may be in a range of 20 to 25 volts direct current (DC). The driving voltage may be provided by the first electrodes in conjunction with the second electrode. In embodiments, the second electrode provides a common voltage Vcom of approximately 0 volts DC while the first electrodes provide approximately 20 to 25 volts DC when driving the electrowetting elements. The reset pulse generally corresponds to changing the driving voltage to Vcom, which in this example is 0 volts DC.

In a number of embodiments an electrowetting display device may be a transmissive, transparent, reflective or transflective display that generally includes an array of electrowetting elements configured to be operated by an active matrix addressing scheme. For example, rows and columns of electrowetting elements are operated by controlling voltage levels on a plurality of data lines and gate lines. In this fashion, the electrowetting display may produce an image by selecting particular electrowetting elements to transmit, reflect or block light. Electrowetting elements may be addressed (e.g., selected) via rows and columns of the data lines and gate lines that are electrically connected to transistors (e.g., used as switches) included in each electrowetting element. Transistors take up a relatively small fraction of the area of each electrowetting element to allow light to efficiently pass through (or reflect from) the electrowetting element. For example, the transistor may be located underneath a reflector in reflective displays. Herein, an electrowetting element may, unless otherwise specified, comprise a single subpixel or a pixel that includes two or more subpixels of an electrowetting display. Such a pixel or subpixel may be the smallest light transmissive, reflective or transflective element of an electrowetting display that is individually operable to directly control an amount of light transmission through and/or reflection from the electrowetting element. For example, in some implementations, a pixel may be a pixel that includes a red subpixel, a green subpixel, a blue subpixel, and a white subpixel (e.g., as in a PenTile® layout). In such implementations, each red subpixel, green subpixel, blue subpixel, and white subpixel is implemented via separate electrowetting elements. In other implementations, a pixel may be a pixel that is a smallest component, e.g., the pixel does not include any subpixels.

Hereinafter, example embodiments describe electrowetting displays comprising an array of electrowetting elements sandwiched between a first support plate and a second support plate. The first support plate may be opaque while the second support plate may be transparent. Herein, describing an element or material as being "transparent" means that the element or material may transmit a relatively large fraction of the light incident upon it. For example, a transparent substrate or layer may transmit more than 70% or 80% of the light impinging on its surface, though claimed subject matter is not limited in this respect.

The transparent second support plate may comprise glass or any of a number of transparent materials, such as plastic, quartz, semiconductors, and so on, though claimed subject matter is not limited in this respect. Also, as used herein for sake of convenience of describing example embodiments, the second support plate is that through which viewing of pixels of an electrowetting display occurs. In other embodiments, such orientations and positioning of support plates and other elements of an electrowetting display may be at least partially reversed. Claimed subject matter is not limited in this respect.

Partition walls retain at least the first fluid (which may be electrically non-conductive and/or non-polar) such as opaque or colored oil, in the individual electrowetting elements. An "opaque" fluid, as described herein, is used to describe a fluid that appears black or colored to an observer. For example, a black opaque fluid strongly absorbs a broad spectrum of wavelengths (e.g., including those of red, green and blue) in the visible region of electromagnetic radiation.

A cavity formed between the support plates is filled with the first fluid (e.g., the first fluid is retained by the partition walls) and a second fluid (e.g., a solution that includes an electrolyte, generally referred to as an electrolyte solution) that is polar and may or may not be electrically conductive. The second solution may be a water solution, such as a mixture of water and ethyl alcohol, or a salt solution, such as a solution of potassium chloride in water. The second fluid may be transparent, but may be colored, or light-absorbing. The second fluid is at least partially immiscible with the first fluid.

A spacer grid and edge seals, which mechanically connect the first support plate with the second overlying support plate, or which form a separation between the first support plate and the second support plate, contribute to the mechanical integrity of the electrowetting display. Edge seals, for example, being disposed along a periphery of an array of electrowetting display device pixels, may contribute to retaining (e.g., first and second) fluids between the first support plate and the second overlying support plate.

In some embodiments, an electrowetting display as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient light) or out-coupled from a light guide of the display device. For example, display software may include code executable by a processor to modulate optical properties of individual electrowetting elements of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

For driving of electrowetting displays, a dedicated gate scanning algorithm is generally implemented. In general, a first write action discharges an electrowetting element to a reset level, e.g., a black level voltage, which is also referred to as a reset of the electrowetting element. A second write action generally charges the electrowetting element to an actual required display data value.

The power consumption of an electrowetting display depends on the electrowetting display's physical properties, as well as image content. The power consumption of an electrowetting display can be modeled as an array of capacitors (corresponding to electrowetting elements), which are continuously charged and discharged with new image data. The most relevant parameters are capacitive load (of the electrowetting elements and the electrowetting display), drive voltage for the electrowetting elements and the addressing rate for the electrowetting elements. These parameters determine the rate and charge required to readdress the electrowetting display, according the formula $P = \Sigma_1^{height} \Sigma_1^{width} (a*f*C*V^2)$, where P represents power required for a display driver of the electrowetting display, height represents the number of rows of the electrowetting elements of the electrowetting display, width represents the number of columns of electrowetting elements of the electrowetting display, a represents an activity factor that depends on image content and generally corresponds to temporal activity of a source driver of the electrowetting display, f represents the frequency of addressing the electrowetting elements in the electrowetting display, C represents the capacitive load of the electrowetting elements and the electrowetting display, and V represents the voltage output by the display driver. In certain conditions, the display driver for the electrowetting display may consume too much energy for a given application.

The perceived picture quality by a viewer of the electrowetting display is affected by brightness variations of the electrowetting display due to leakage (voltage leakage from storage capacitors of pixel regions of the electrowetting display), backflow (fluid movement within the pixel regions of the electrowetting display) and reset pulses (resetting of pixel regions within the electrowetting display). The brightness variations depend upon physical properties of the electrowetting display, as well as the input frame-rate from the image source, repeat rate for mitigating leakage, and refresh rate for mitigating backflow and reset pulse intensity.

In accordance with various embodiments, voltage provided by the second electrode may be modulated with a compensation voltage. In such embodiments, luminance reduction due to the backflow effect can be compensated for by gradually driving the electrowetting elements with an increasing (limited) amplitude of extra voltage, i.e. compensation voltage, in order to stabilize and/or increase luminance levels for electrowetting elements that are displaying bright content as well as dark content. More particularly, if the electrowetting elements are driven by a negative voltage (so effectively a negative voltage over the electrowetting elements), the common voltage is e.g. at 0 volts for a non-compensated state. The compensated state includes an increasing amplitude of positive common voltage up to, for example, +1 V. However, if the electrowetting elements are driven with a positive voltage, the compensated state includes an increasing amplitude of negative common voltage up to, for example, −1 V. By slowly increasing, i.e., modulating, the amplitude of voltage provided by the second electrode, the electrowetting elements can be overdriven, thereby compensating over time for reduced luminance of the electrowetting elements due to the backflow effect.

Additionally, a temporal compensation may be introduced to compensate for these dips in the luminance of the electrowetting elements due to reset pulses. Just prior to and/or immediately subsequent to application of a reset pulse, and thus the accompanying luminance dip, extra brightness may be created in the electrowetting elements by temporarily increasing the voltage provided by the second electrode in order to create more light at these moments of time (e.g., one addressing cycle) when the luminance of the electrowetting elements dips due to the reset pulses.

While increasing voltage does require more power, the increased voltage results in reduced readdressing of the image data to the electrowetting elements, which provides for a greater power savings. Thus, overall power consumption within the electrowetting display is reduced while luminance is improved.

Referring to FIG. 1A, an example of an electrowetting display 100 is schematically illustrated that includes a timing controller 102, a source driver (data driver) 104, a gate driver (scan driver) 106, a voltage generator 108, and an electrowetting display panel 110. The electrowetting display panel 110 is driven by the timing controller 102, the source driver 104, the gate driver 106 and the voltage generator 108 based upon image data received from an external image source. In embodiments, the timing controller 102 may comprise a memory (not illustrated) to store the image data received from the image source.

As an example of general operation of the electrowetting display 100, responsive to a first data signal DG1 and a first control signal C1 from an external image source, e.g., a graphic controller (not illustrated), the timing controller 102 applies a second data signal DG2 and a second control signal C2 to the source driver 104; a third control signal C3 to the gate driver 106; and a fourth control signal C4 to the voltage generator 108. The source driver 104 converts the second data signal DG2 to voltages, i.e., data signals, and applies the data signals D1, . . . , Dp−1, Dp, Dp+1, . . . , Dm to the electrowetting display panel 110. The gate driver 106 sequentially applies scan signals S1, . . . , Sq−1, Sq, . . . , Sn to the electrowetting display panel 110 in response to the third control signal C3.

The timing controller 102 controls the voltage generator 108, applies a common voltage Vcom to a second electrode (also known a common electrode and illustrated as 156 in FIG. 1B) of the electrowetting display panel 110 in response to the fourth control signal C4. Although not illustrated in FIG. 1A, the voltage generator 108 generates various voltages required by the timing controller 102, the source driver 104, and the gate driver 106. For example, the voltage generator 108 may generate voltages for the source driver 104 and the gate driver 106, in addition to the common voltage Vcom.

Electrowetting elements 112 are positioned adjacent to crossing points of the data lines D and the gate lines S and thus are arranged in a grid of rows and columns. Each electrowetting element 112 includes a hydrophobic surface or portion of a hydrophobic layer (not illustrated in FIG. 1A), a thin film transistor (TFT) 114 in electrical contact with a first electrode (also known as a pixel electrode) 116 under the hydrophobic surface. A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example. Each electrowetting element 112 may also include a storage capacitor (not illustrated) under the hydrophobic surface.

A plurality of intersecting partition walls (also known as pixel walls) 118 separates the electrowetting elements 112. The electrowetting elements 112 can represent pixels within the electrowetting display panel 110 and/or subpixels within the electrowetting display panel 110, depending upon the application for the electrowetting display 100.

The electrowetting display panel 110 includes m data lines D, i.e., source lines, to transmit the data voltages and n gate lines S, i.e., scan lines, to transmit a gate-on signal to the TFTs 114 to control the electrowetting elements 112. Thus, the timing controller 102 controls the source driver 104 and the gate driver 106.

As previously noted, the timing controller 102 applies a second data signal DG2 and a second control signal C2 to the source driver 104; a third control signal C3 to the gate driver 106; and a fourth control signal C4 to the voltage generator 108 to drive the electrowetting elements 112. The gate driver 106 sequentially applies scan signals S1, . . . , Sq−1, Sq, . . . , Sn to the electrowetting display panel 110 in response to the third control signal C3 to activate rows of electrowetting elements 112 via the gates of the TFTs 114. The source driver 104 converts the second data signal DG2 to data voltages, i.e., data signals, and applies the data signals D1, . . . , Dp−1, Dp, Dp+1, . . . , Dm to sources (or drains) of the TFTs 114 of the electrowetting elements 112 within an activated row of the electrowetting elements 112 to thereby, in conjunction with a voltage provided by the second electrode, activate (or leave inactive) electrowetting elements 112 within the activated row of the electrowetting elements 112.

Figure 1B:
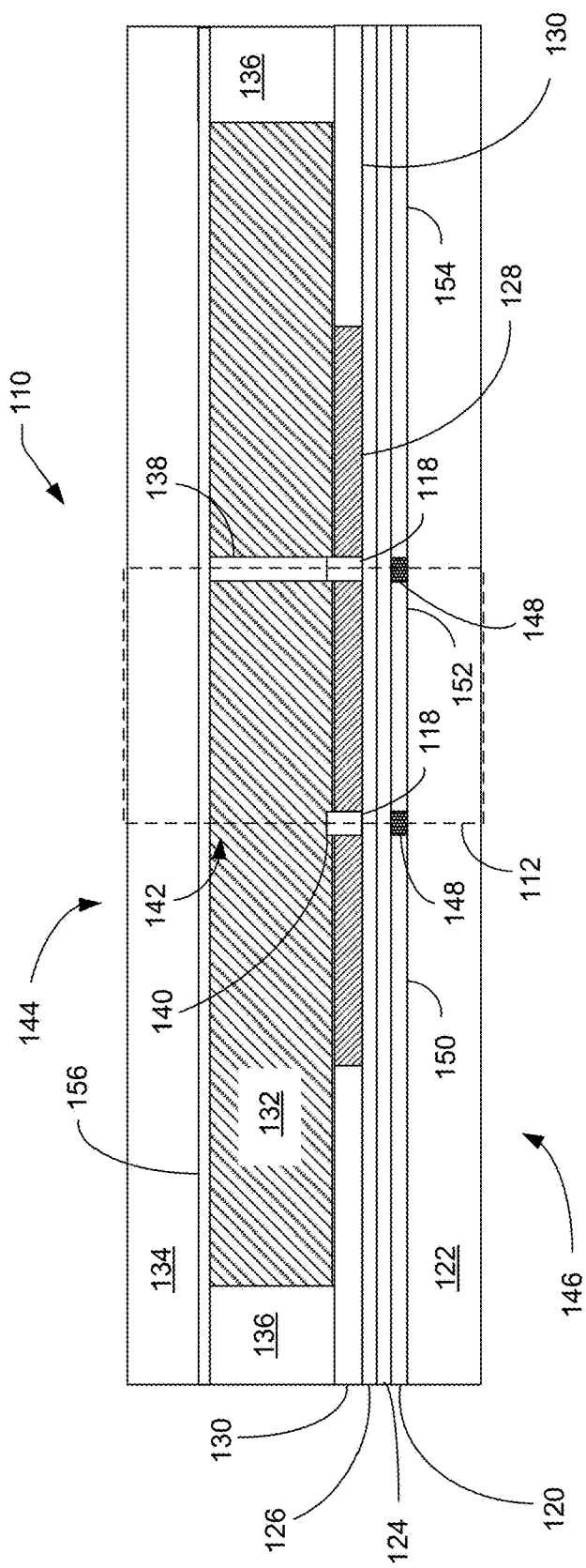
FIG. 1B is a cross-section of an electrowetting display panel of the electrowetting display of FIG. 1A, according to some embodiments.

FIG. 1B is a cross-section of a portion of the electrowetting display panel 110 illustrating several electrowetting elements 112, according to some embodiments. Though three such electrowetting elements 112 are illustrated, an electrowetting display panel may include any number (usually a very large number, such as thousands or millions) of electrowetting elements. An electrode layer 120 is disposed on a first support plate 122 and may comprise one or more individual electrodes (e.g., first electrodes 116) in each electrowetting element 112.

In various embodiments, the electrode layer 120 may be connected to any number of thin film transistors (TFTs) (e.g., TFTs 114)) that are switched to either select or deselect electrowetting elements 112 using active matrix addressing, for example. In some implementations, a barrier layer 124 may at least partially separate the electrode layer 120 from a hydrophobic layer 126 also disposed on the first support plate 122. In some implementations, the hydrophobic layer 126 may comprise any of a number of types of fluoropolymers, such as AF1600®, produced by DuPont, based in Wilmington, Del. The hydrophobic layer 126 may also be any of a number of water-repelling materials that affect wettability of an adjacent material, for example.

The partition walls 118 form a patterned electrowetting element grid on the hydrophobic layer 126. The partition walls 118 may comprise a photoresist material such as, for example, epoxy-based negative photoresist SU-8. The patterned electrowetting element grid comprises rows and columns, as illustrated in FIG. 1A, that form an array of electrowetting elements. For example, an electrowetting element may have a width and length in a range of about 50 to 500 microns. In some implementations, the partition walls 118 need not be on the hydrophobic layer 126. For example, the partition walls 118 may be directly on the electrode layer 120 (not illustrated in FIG. 1B).

A first fluid 128, which may have a thickness (e.g., depth, height) in a range of about 1 to 10 microns, for example, overlies the hydrophobic layer 126. The first fluid 128 is partitioned by the partition walls 118 of the patterned electrowetting element grid. An outer rim 130 may comprise the same material as the partition walls 118. A second fluid 132, such as an electrolyte solution, overlies the first fluid 128 and the partition walls 118 of the patterned electrowetting element grid. The first fluid 128 is at least partially immiscible with the second fluid 132 so that the first fluid and the second fluid do not substantially mix with each other, and in some examples do not mix with each other to any degree. Herein, substances are immiscible with one another if the substances do not substantially form a solution. The second fluid 132 is preferably transparent, but may be colored or absorbing. The first fluid 128 is non-polar and/or non-conductive and may for instance be an alkane such as, for example, hexadecane or (silicone) oil.

A second support plate 134 covers the second fluid 132 and edge seals 136 maintain the second fluid 132 over the electrowetting element array. The second support plate 134 may be supported by the edge seals 136 and a spacer grid array 138, a portion of which is illustrated in FIG. 1B. The spacer grid array 138 may substantially extend over the array of electrowetting elements 112. For example, portions of the spacer grid 138 may extend from the tops 140 of the partition walls 118 to the second support plate 134.

The electrowetting display panel 110 has a viewing side 144 on which an image formed by the electrowetting display panel 110 may be viewed, and a rear side 146. The second support plate 134 faces the viewing side 144 and the first support plate 122 faces the rear side 146. The electrowetting display panel 110 may be an active matrix driven display type or a passive matrix driven display, just to name a few examples.

Separation block 148 represents a discontinuity of electrical conductivity along the electrode layer 120. For example, a first portion 150 of the electrode layer 120 may be electrically insulated or separated from a second portion 152 and a third portion 154 of the electrode layer 120 so that each portion 150, 152, and 154 is connected to a respective electrowetting element 112. The electrode layer 120 does not necessarily need to extend to edges of the display area of the electrowetting display panel, as illustrated in FIG. 1B, i.e. the electrode layer does not necessarily need to extend under the outer rim 130 and/or the edge seals 136.

In some embodiments, the electrowetting elements 112 includes a second electrode 156 (also known as a common electrode) disposed on the second support plate 134, one or more color filters (not illustrated), or a black matrix (not illustrated). The second electrode 156 on the second support plate 134 may or may not be patterned to form any of a number of circuit configurations, for example.

The hydrophobic layer 126 is arranged on the first support plate 122 to create an electrowetting surface area. The hydrophobic character of the hydrophobic layer 126 causes the first fluid 128 to adhere preferentially to the first support plate 122 since the first fluid 128 has a higher wettability with respect to the surface of the hydrophobic layer 126 than the second fluid 132. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

The first fluid 128 absorbs at least a part of the optical spectrum. The first fluid 128 may be transmissive for a part of the optical spectrum, forming a color filter. For this purpose, the fluid may be colored by addition of pigment particles or dye, for example. Alternatively, the first fluid 128 may be colored or black (e.g., absorbing substantially all parts of the optical spectrum) or reflecting. The hydrophobic layer 126 may be transparent or colored. A reflective layer (not illustrated) may be included and may reflect the entire visible spectrum, making the layer appear white, or part of the visible spectrum, causing the layer to have a color. In embodiments, other layers, or combinations of layers, described herein may have reflective properties as just described and thus, such embodiments may not include a separate reflective layer.

If a voltage is applied across the electrowetting element 112 (e.g., between the electrode layer 120 and the second electrode 156), the electrowetting element 112 will enter into an active state. Electrostatic forces will move the second fluid 132 toward the electrode layer 120, thereby displacing at least a portion of the first fluid 128 from the area of the hydrophobic layer 126 to the partition walls 118 surrounding the area of the hydrophobic layer 126 (or some other area of the electrowetting element 112 depending on the application), to a droplet-like shape. The electrowetting element 112 may be referred to as open or activated. Such displacing action at least partly uncovers the first fluid 128 from the surface of the hydrophobic layer 126 of the electrowetting element 112.

If the voltage across the electrowetting element 112 is returned to an inactive signal level of zero or a value near to zero, the electrowetting element 112 will return to an inactive state, where the first fluid 128 flows back to cover the hydrophobic layer 126. The electrowetting element 112 may be referred to as closed or deactivated. In this way, the first fluid 128 forms an electrically controllable optical switch in each electrowetting element 112. Of course, such details of an electrowetting display are merely examples, and claimed subject matter is not limited in this respect.

Figure 1C:
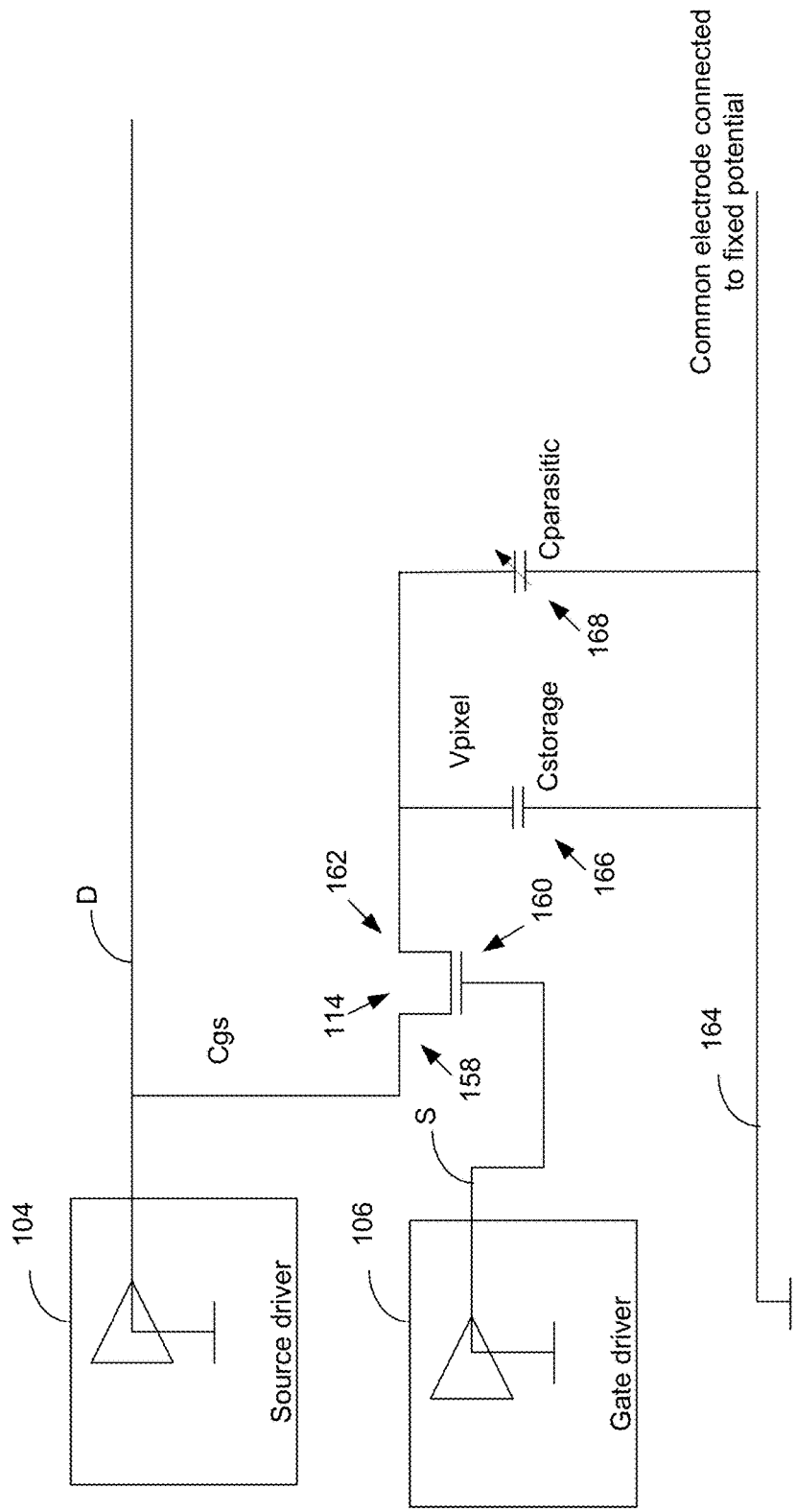
FIG. 1C is a schematic view representing circuitry for electrowetting elements within the electrowetting display panel of FIGS. 1A and 1B, according to some embodiments.

FIG. 1C schematically illustrates an arrangement of thin film transistor (TFT) 114 for an electrowetting element 112 within the electrowetting display panel 110. Each electrowetting element 112 within the electrowetting display panel 110 generally includes such an arrangement. The source driver 104 is coupled to a data line D. The data line D is coupled to a source 158 of the TFT 114 for the electrowetting element 112. A scan line S is coupled to a gate 160 of the TFT 114. The scan line S is coupled to the gate driver 106. A drain 162 of the TFT 114 is coupled to a common line 164 that is coupled to a fixed potential of the second electrode 156 (not illustrated in FIG. 1C) within the electrowetting display 110. The common line 164 is also coupled to ground. A storage capacitor 166 is provided between the TFT 114 and the common line 164. A variable parasitic capacitance, C parasitic, is present in each electrowetting element 112 between the drain 162 of the TFT 114 and the common line 164. The variable parasitic capacitance is represented by a variable capacitor 168.

In accordance with various embodiments, an electrical charge redistribution between Cstorage 166 and Cparasitic 168 takes place after each change of the pixel voltage, due to the variable nature of Cparasitic 168. This charge redistribution may be compensated for by recharging the capacitors 166 and 168 in FIG. 1C such that nominal luminance levels can be reached and the luminance deficit becomes virtually invisible to a viewer. When the timing controller 102 addresses a refresh sequence, electrowetting elements 112 are reset to '0' (i.e. deactivated) by applying a reset pulse in response to a reset control signal from the timing controller 102 for a period of about 1 millisecond to mitigate the backflow effect, reducing the value of Cparasitic 168. When the reset pulse period has passed, the initial image data values are restored by repeatedly readdressing the electrowetting elements 112 with their initial data values, increasing the value of Cparasitic 168. As the capacitance varies with the position of the two liquids 128 and 132 on the electrowetting element 112 (called White Area (WA)) the parasitic capacitance depends, with some latency, on the electrowetting element voltage. The storage capacitor 166 of the electrowetting element 112 is in parallel with the parasitic capacitor 168 and hence, will share its charge with the changing capacitance of the electrowetting element 112. Due to this charge redistribution, the voltage over the electrowetting elements 112 will drop after resetting and readdressing the storage capacitors 166 with their initial data values. The electrowetting elements 112 become less transmissive/reflective.

To mitigate such a charge redistribution issue, the storage capacitors 166 can be repeatedly readdressed with their initial data values. After a few iterations, the electrowetting element 112 voltage will match with the voltage provided by the display drivers 104, 106. After an electrical reset pulse is applied, which reduces the luminance, the electrowetting elements 112 are readdressed a first time with their initial data values. The redistribution of charge limits the maximum luminance level. When addressing the electrowetting elements 112 for a second time with their initial data values, the voltage levels are restored. Yet after the second addressing, the distribution of charge can still be less than a maximum luminance level. When addressing the electrowetting elements 112 for a third time with their initial data values, the remaining effect of charge redistribution can be neglected.

A luminance reduction impulse due to the electrical reset pulse can be compensated for by adding additional luminance nearby in the spatial and/or temporal domain such that luminance reduction impulse becomes hardly visible to a viewer. When the timing controller 102 addresses a refresh sequence, electrowetting elements 112 are addressed to '0' with a reset pulse for a period of about 1 millisecond to mitigate the backflow effect. During this period the liquids 128, 132 in the electrowetting elements 112 will react to this new value, resulting in a temporal drop of luminance. When the reset pulse period has passed, the initial data values are restored by repeatedly readdressing the electrowetting elements 112 with their initial data values. The luminance deficit can be compensated for by increasing the luminance temporally near application of the reset pulse. By increasing the voltage driving level just before and just after the reset period, i.e. applying an overdrive voltage, to a value equal to the missing luminance, the desired luminance level can generally be restored. An average viewer will temporally low-pass filter the increased luminance while viewing the electrowetting display 110, thus making the reset pulse barely visible to the viewer. After applying a reset pulse, the initial data values need to be rewritten a few times to the electrowetting elements 112, due to the charge redistribution as previously discussed.

Figure 2:
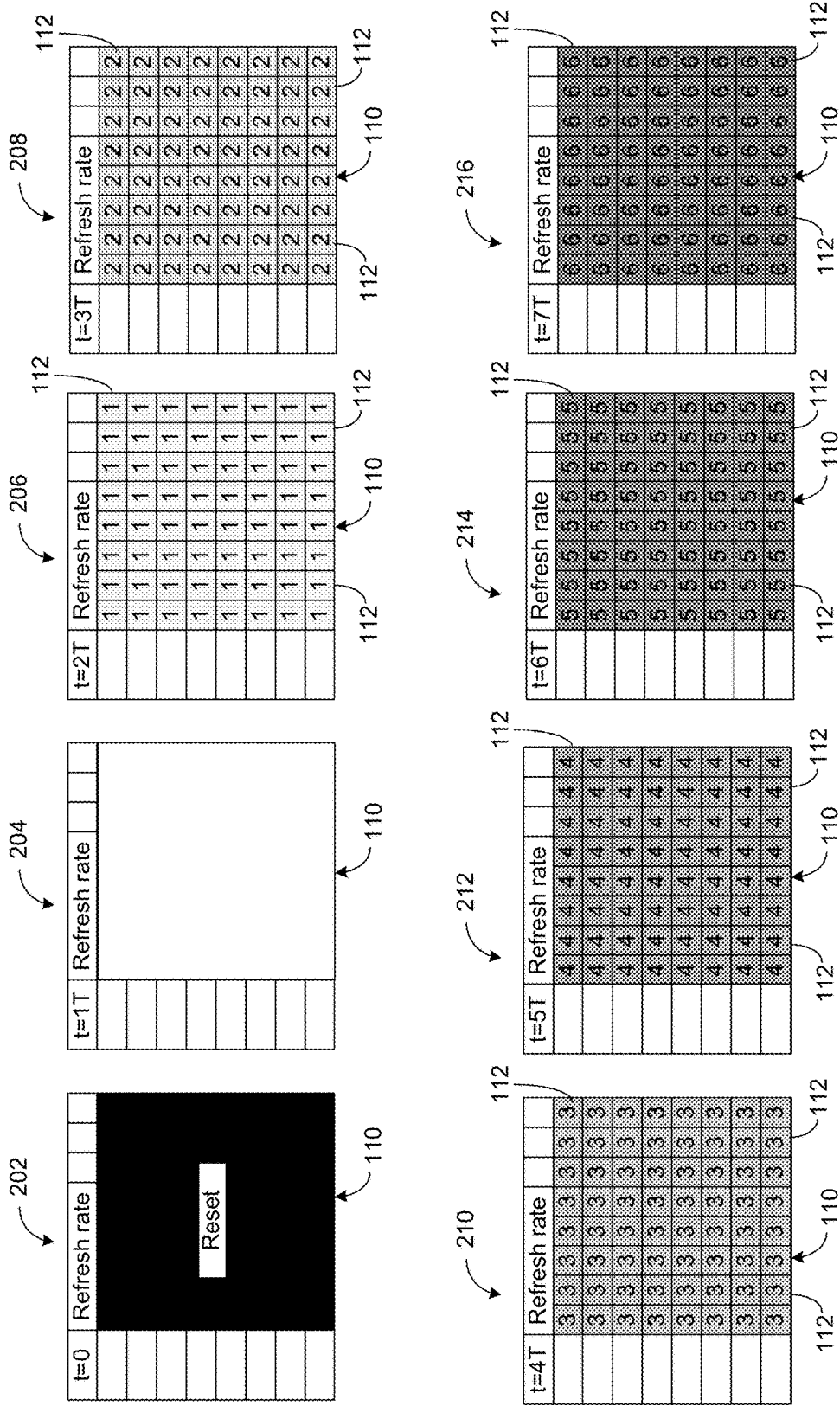
FIG. 2 is a diagram illustrating an example of refreshing rows of pixel regions and the effects on luminance, according to some embodiments.

To mitigate the backflow effect, as previously noted, at regular temporal intervals a reset pulse is driving the electrowetting elements 112 of the electrowetting display panel 110. The reset pulse restores the electrowetting elements' initial luminance, yet after some time luminance will reduce due to the backflow effect. In accordance with embodiments, a refresh sequence is utilized that addresses all electrowetting elements 112 of the electrowetting display panel 110 with a reset pulse, followed by a repeated addressing of image data. However, after repeated addressing the electrowetting display panel 110 with image data for a prolonged period of time, e.g. 1 second, the display's luminance will slowly reduce. This effect can be seen in FIG. 2. As can be seen at 202, during a reset pulse at t=0, the electrowetting display panel 110 is black as all electrowetting elements 112 are reset, i.e. closed. At 204 and t=1T ($1^{st}$ readdressing cycle of the refresh sequence at frame rate T), image data is readdressed to the electrowetting elements 112 and luminance of the electrowetting panel 110 is very good. Gradually, as image data is readdressed to the electrowetting elements 112 from 206 to 216 (t=2T to t=7T readdressing cycles of the refresh cycle), luminance slowly reduces, as represented by the electrowetting elements 112 increasing in darkness and the increasing integer values in the electrowetting elements 112.

In accordance with various embodiments, a common voltage (e.g., Vcom) provided to the electrowetting elements 112 by the second electrode 156 via the voltage generator 108 may be modulated with a compensation voltage. In such embodiments, luminance modulation or degradation (reduction) due to the backflow effect can be compensated for by gradually driving the electrowetting elements 112 with an increasing (limited) amplitude of extra voltage, i.e. compensation voltage, in order to stabilize luminance levels for electrowetting elements 112 that are displaying bright content as well as dark content. By slowly increasing, i.e., modulating, the amplitude of the voltage Vcom provided by the second electrode 156, voltages of the electrowetting elements 112 can be overdriven, thereby compensating over time for reduced luminance of the electrowetting elements 112 due to the backflow effect. The increasing voltage helps maintain the displacement of the portion of the first fluid 128 from the area of the hydrophobic layer 126 to the partition walls 118 surrounding the area of the hydrophobic layer 126.

Additionally, by gradually modulating voltages of the electrowetting elements 112 in order to maintain their nominal luminance, the luminance drop due to application of the reset pulse may be less severe, thereby resulting in a less significant visual effect. As electrical charge redistribution effects inside the electrowetting elements 112 reduce the actual voltage of the electrowetting elements 112 after a reset pulse has been applied, as previously noted, multiple readdressing of the image data to the electrowetting elements 112 is required to fully restore the initial voltage of the electrowetting elements 112 after a reset pulse has cleared the content of the electrowetting elements 112. When driving the voltage of these electrowetting elements 112 to a higher than nominal voltage, the initial voltage of the electrowetting elements 112 may be restored more quickly. Modulation of the voltage Vcom provided by the second electrode 156 may be used to overdrive the electrowetting elements 112, thereby compensating for the luminance drop and hence, luminance modulation due to electrical charge redistribution effects as previously described may be compensated for by modulating the voltage provided by the second electrode 156.

As previously noted, the reset pulses applied to the electrowetting elements 112 generally cause short dips in the luminance of the electrowetting elements 112. A temporal compensation may be introduced to compensate for these dips. Just prior to and/or immediately subsequent to application of a reset pulse, and thus the accompanying luminance dip, extra brightness may be created in the electrowetting elements 112 by temporarily increasing the voltage provided by the second electrode 156 in order to create more light at these moments of time (e.g., one addressing cycle) when the luminance of the electrowetting elements 112 dips due to the reset pulses.

Additionally, electrowetting elements 112 that are intentionally driven to relatively dark brightness levels based upon image data may unexpectedly close while being driven by a nominal reset pulse, thereby leading to hysteresis related visual artifacts. Since the impact of the reset pulse on the luminance of the electrowetting elements 112 due to the increased amplitude of the voltage provided by the second electrode 156 just prior to and/or immediately subsequent to application of the reset pulse is less severe, it is generally easier to control the brightness of the electrowetting elements 112 and thereby prevent undesired closing of electrowetting elements 112 that are intentionally driven to relatively dark brightness levels based upon image data.

Figure 3A:
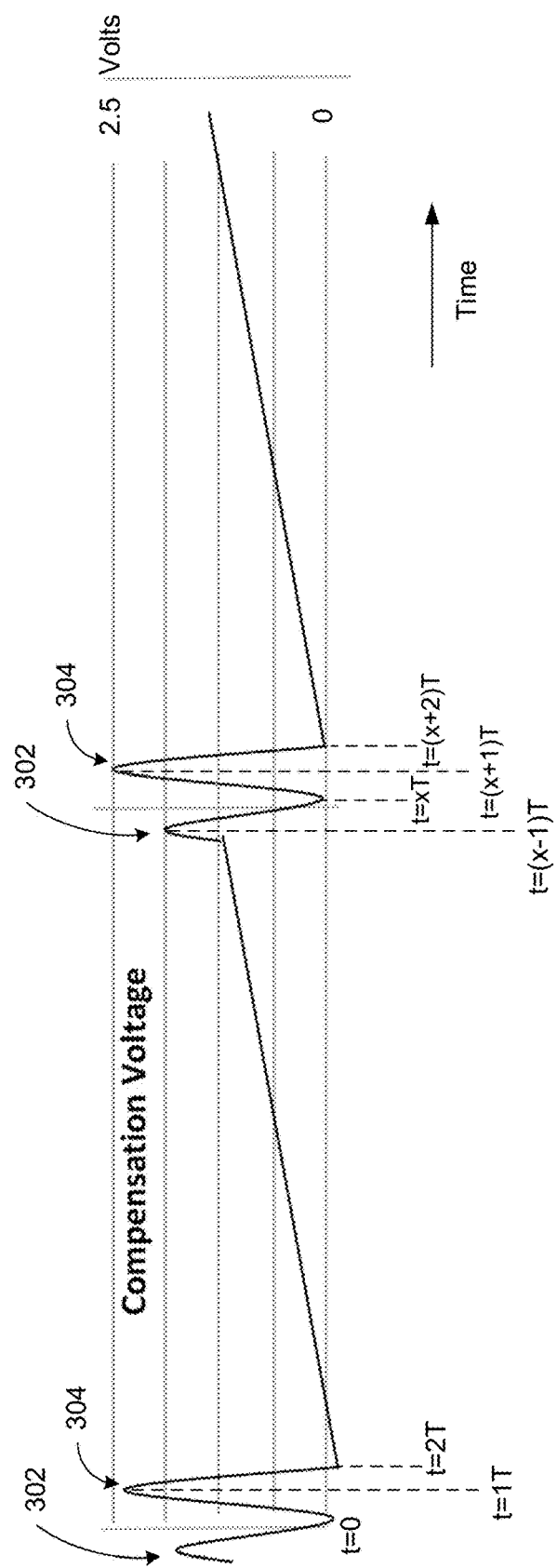
FIG. 3A is a diagram illustrating an example of providing a compensation voltage to electrowetting elements, according to some embodiments.

FIG. 3A is a graph that illustrates increasing the amplitude of the voltage Vcom provided by the second electrode 156 with a compensation voltage for improving luminance of the electrowetting elements 112. As may be seen, just prior to time t=0 (when a reset pulse may be applied to the electrowetting elements 112), the amplitude of the Vcom voltage may be increased at 302 with a compensation voltage. When the reset pulse is applied, the voltage Vcom returns to a non-compensated state and immediately after application of the reset pulse at time t=0, the amplitude of the voltage Vcom provided by the second electrode 156 may immediately be increased at 304 (t=1T, where T is the frame rate) with a compensation voltage in order to improve the luminance of the electrowetting elements 112. The voltage Vcom is then decreased to the non-compensated state at t=2T and the amplitude of the voltage Vcom gradually increases over time to improve the luminance of the electrowetting elements 112 during readdressing of the electrowetting elements 112 with image data. The readdressing of the electrowetting elements 112 occurs at the frame rate T from t=2T until a threshold x is reached. When the threshold is reached, a new refresh sequence is instituted at t=xT and the amplitude of the voltage Vcom is increased at 302 at t=(x−1)T. The voltage Vcom returns to the non-compensated state at t=xT, when a reset pulse is applied. At t=(x+1)T, the amplitude of the voltage Vcom may immediately be increased at 304. At t=(x+2)T, voltage Vcom is decreased to the non-compensated state and the amplitude of the voltage Vcom gradually increases over time to improve the luminance of the electrowetting elements 112 during readdressing of the electrowetting elements 112 with image data. The process repeats itself throughout each refresh sequence. Generally, by gradually increasing the amplitude of the voltage Vcom with a compensation voltage, the time between reset pulses may be increased, i.e. the refresh sequence may be increased. In embodiments, x is in a range of 10 to 30. Thus, in such embodiments the refresh sequence is in a range of 10 T to 30 T. An addressing cycle counter, e.g., timing controller can monitor when x has been reached. FIG. 3B is a graph comparing the luminance of the electrowetting elements 112 without increasing the amplitude of voltage Vcom provided by the second electrode 156 (line 306) with a compensation voltage and the luminance of the electrowetting elements 112 with increasing the amplitude of the voltage Vcom provided by the second electrode 156 with a compensation voltage (line 308). The timeline of FIG. 3B generally corresponds with the timeline of FIG. 3A.

As an example, in accordance with embodiments, the initial driving voltage provided by the first and second electrodes 116, 156 within the electrowetting elements 112 may be approximately −25 volts. The initial voltage Vcom provided by the second electrode 156 may be approximately 0 volts. By gradually increasing the amplitude of the voltage Vcom provided by the second electrode 156 in a positive voltage direction to a maximum in a range of 8-12% maximum of the initial driving voltage, e.g., approximately 10%, the overall driving voltage of the electrowetting display panel 110 is increased to approximately 27-28 volts. While increasing voltage does require more power, the reduced application of a reset pulse to the electrowetting elements 112 provides for a greater power savings and thus, overall power consumption within the electrowetting display panel 110 may be reduced while luminance is improved. For example, the electrowetting display may be addressed at a frequency in a range of, for example, 30 to 60 Hz but reset pulses may be applied at a frequency of, for example, 1 Hz, thereby reducing overall power consumption. Thus, for example, just prior to a reset pulse, the amplitude of the voltage Vcom provided by the second electrode 156 may be increased in a range of, for example, 1.8 to 2.2 volts (e.g., approximately 2 volts) and immediately subsequent to the reset pulse, the amplitude of the voltage Vcom provided by the second electrode 156 may be increased in a range of, for example, 2.2 to 2.8 volts (e.g., approximately 2.5 volts). In embodiments, at t=0 the amplitude of the voltage Vcom provided by the second electrode 156 drops to its non-compensated state and then gradually increases until just prior to the next or subsequent reset pulse. In accordance with embodiments, the amplitude of the voltage Vcom gradually increases to a maximum in a range of 4 to 6 percent, e.g., 5 percent. In other embodiments, the amplitude of the voltage Vcom gradually increases to a maximum in a range of 8 to 12 percent, e.g., 10 percent. In such embodiments, the voltages provided by the second electrode 156 just prior to and just after a reset pulse may be larger than the previous examples provided. Also, while the examples provided are with reference to positive voltages, the examples relate to amplitudes and thus, negative voltages may be used.

Figure 4:
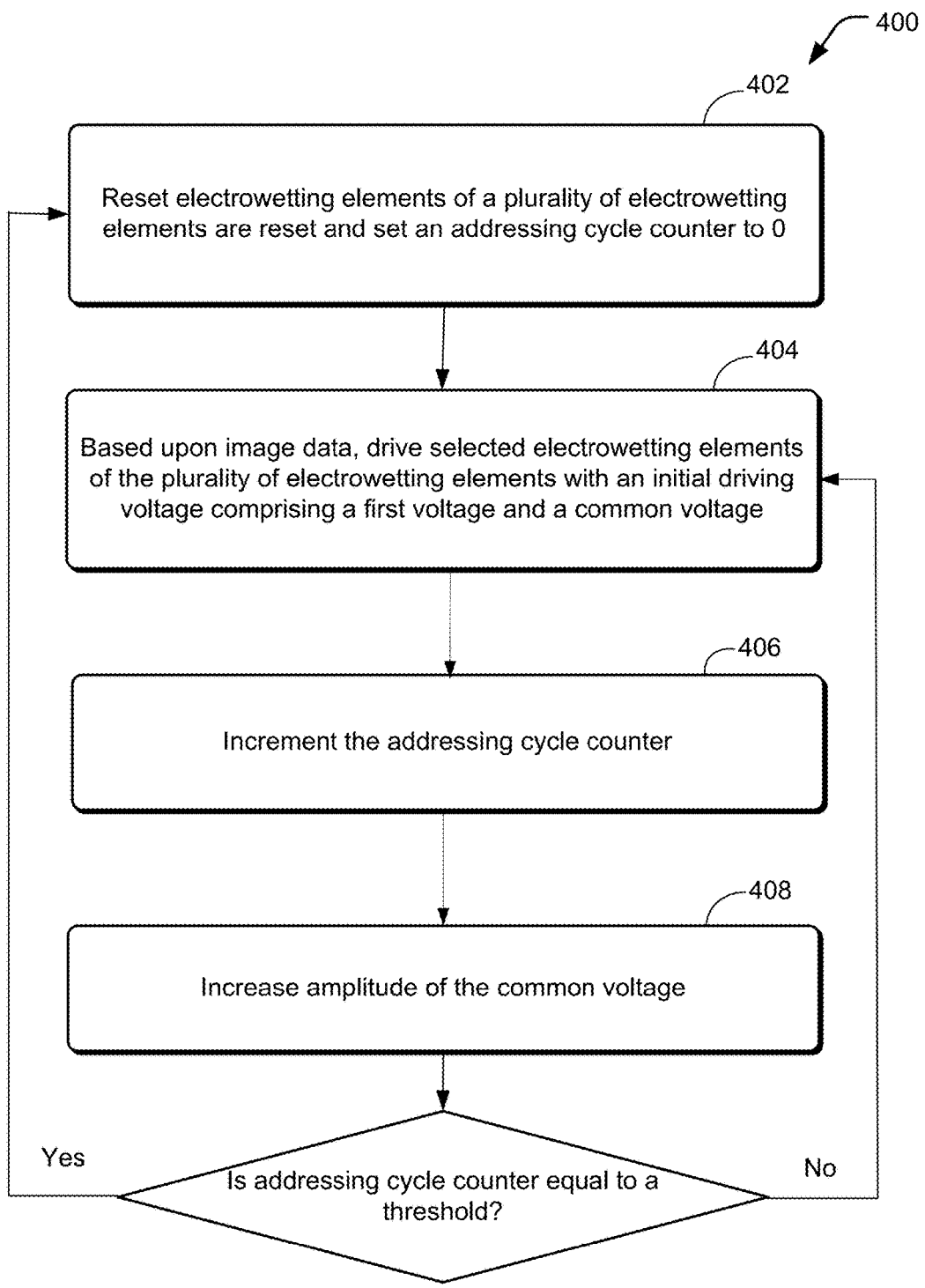
FIG. 4 is a flowchart illustrating a process of providing a compensation voltage to electrowetting elements of an electrowetting display, according to various embodiments.

FIG. 4 is a flowchart illustrating a process 400 of driving an electrowetting display through a refresh sequence, for example an electrowetting display as described in FIGS. 1A-1C. At 402, electrowetting elements of a plurality of electrowetting elements are reset and an addressing cycle counter is set to 0. At 404, based upon image data, selected electrowetting elements of the plurality of electrowetting elements are driven with an initial driving voltage comprising a first voltage and a common voltage. At 406, the addressing cycle counter is incremented. At 408, the amplitude of the common voltage is increased. At 410, the addressing cycle counter is checked to see if the number of addressing cycles has reached a threshold, where the threshold is based upon an acceptable level of a reduction in luminance of the electrowetting elements during a refresh sequence. If the threshold, has been reached, the process 400 returns to 402 to begin a new refresh sequence. If the threshold has not been reached, then the process 400 returns to 404.

Figure 5:
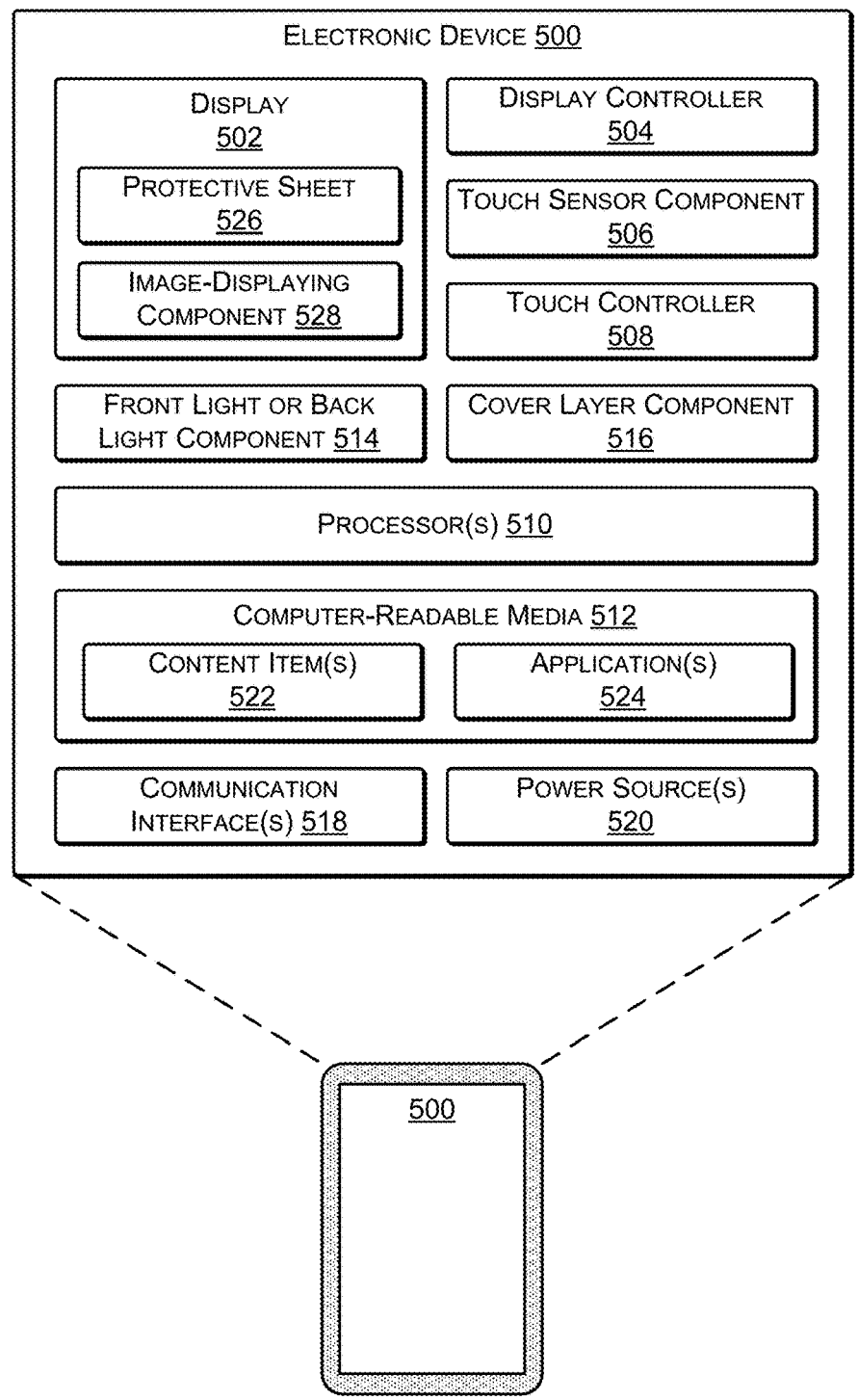
FIG. 5 illustrates an example electronic device that may incorporate a display device, according to some embodiments.

FIG. 5 illustrates an example electronic device 500 that may incorporate any of the displays discussed above. The device 500 may comprise any type of electronic device having a display. For instance, the device 500 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 500 may be a non-mobile electronic device (e.g., a computer display, a television, etc.). In addition, while FIG. 5 illustrates several example components of the electronic device 500, it is to be appreciated that the device 500 may also include other conventional components, such as an operating system, system busses, input/output components, and the like. Further, in other examples, such as in the case of a television or computer monitor, the electronic device 500 may only include a subset of the components illustrated.

Regardless of the specific implementation of the electronic device 500, the device 500 includes a display 502 and a corresponding display controller 504. The display 502 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 502 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 500, the display 502 may be an active display such as a liquid crystal display, a plasma display, a light emitting diode display, an organic light emitting diode display, an electrowetting display and so forth. Accordingly, implementations herein are not limited to any particular display technology.

In an implementation, the display comprises an electrowetting display that employs an applied voltage to change the surface tension of a fluid in relation to a surface. For example, such an electrowetting display may be the same as or similar to the electrowetting displays illustrated in FIGS. 1A-1C, though claimed subject matter is not limited in this respect. By applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels or subpixels of the display. When the voltage is absent, the colored oil forms a continuous film within a pixel or subpixel, and the color may thus be visible to a user of the display. On the other hand, when the voltage is applied to the pixel or subpixel, the colored oil is displaced and the pixel or subpixel becomes transparent. When multiple pixels or subpixels of the display are independently activated, the display can present a color or grayscale image. The pixels or subpixels may form the basis for a transmissive, reflective, or transmissive/reflective (transflective) display. Further, the pixels or subpixels may be responsive to high switching speeds (e.g., on the order of several milliseconds), while employing small pixel or subpixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels or subpixels. As such, the terms "white," "gray," and "black" may refer to varying degrees of color in implementations utilizing color displays. For instance, where a pixel or subpixel includes a red color filter, a "gray" value of the pixel or subpixel may correspond to a shade of pink while a "black" value of the pixel or subpixel may correspond to a darkest red of the color filter. Furthermore, while some examples herein are described in the environment of a reflective display, in other examples, the display 502 may represent a backlit display, examples of which are mentioned above.

In addition to including the display 502, FIG. 5 illustrates that some examples of the device 500 may include a touch sensor component 506 and a touch controller 508. In some instances, at least one touch sensor component 506 resides with, or is stacked on, the display 502 to form a touch-sensitive display (e.g., an electronic paper touch-sensitive display). Thus, the display 502 may be capable of both accepting user touch input and rendering content in response to or corresponding to the touch input. As several examples, the touch sensor component 506 may comprise a capacitive touch sensor, a force sensitive resistance (FSR), an interpolating force sensitive resistance (IFSR) sensor, or any other type of touch sensor. In some instances, the touch sensor component 506 is capable of detecting touches as well as determining an amount of pressure or force of these touches.

FIG. 5 further illustrates that the electronic device 500 may include one or more processors 510 and one or more computer-readable media 512, as well as a front light component 514 (which may alternatively be a backlight component in the case of a backlit display) for lighting the display 502, a cover layer component 516, such as a cover glass or cover sheet, one or more communication interfaces 518 and one or more power sources 520. The communication interfaces 518 may support both wired and wireless connection to various networks, such as cellular networks, radio, WiFi networks, short range networks (e.g., Bluetooth®), infrared (IR), and so forth.

Depending on the configuration of the electronic device 500, the computer-readable media 512 (and other computer-readable media described throughout) is an example of computer storage media and may include volatile and non-volatile memory. Thus, the computer-readable media 512 may include, but is not limited to, RAM, ROM, EEPROM, flash memory, or other memory technology, or any other medium that can be used to store computer-readable instructions, programs, applications, media items, and/or data which can be accessed by the electronic device 500.

The computer-readable media 512 may be used to store any number of functional components that are executable on the processor 510, as well as content items 522 and applications 524. Thus, the computer-readable media 512 may include an operating system and a storage database to store one or more content items 522, such as eBooks, audio books, songs, videos, still images, and the like. The computer-readable media 512 of the electronic device 500 may also store one or more content presentation applications to render content items on the device 500. These content presentation applications may be implemented as various applications 524 depending upon the content items 522. For instance, the content presentation application may be an electronic book reader application for rending textual electronic books, an audio player for playing audio books or songs, a video player for playing video, and so forth.

In some instances, the electronic device 500 may couple to a cover (not illustrated in FIG. 5) to protect the display (and other components in the display stack or display assembly) of the device 500. In one example, the cover may include a back flap that covers a back portion of the device 500 and a front flap that covers the display 502 and the other components in the stack. The device 500 and/or the cover may include a sensor (e.g., a Hall effect sensor) to detect when the cover is open (i.e., when the front flap is not atop the display and other components). The sensor may send a signal to the front light component 514 when the cover is open and, in response, the front light component 514 may illuminate the display 502. When the cover is closed, meanwhile, the front light component 514 may receive a signal indicating that the cover has closed and, in response, the front light component 514 may turn off.

Furthermore, the amount of light emitted by the front light component 514 may vary. For instance, upon a user opening the cover, the light from the front light may gradually increase to its full illumination. In some instances, the device 500 includes an ambient light sensor (not illustrated in FIG. 5) and the amount of illumination of the front light component 514 may be based at least in part on the amount of ambient light detected by the ambient light sensor. For example, the front light component 514 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 502 may vary depending on whether the front light component 514 is on or off, or based on the amount of light provided by the front light component 514. For instance, the electronic device 500 may implement a larger default font or a greater contrast when the light is off compared to when the light is on. In some instances, the electronic device 500 maintains, when the light is on, a contrast ratio for the display that is within a certain defined percentage of the contrast ratio when the light is off.

As described above, the touch sensor component 506 may comprise a capacitive touch sensor that resides atop the display 502. In some examples, the touch sensor component 506 may be formed on or integrated with the cover layer component 516. In other examples, the touch sensor component 506 may be a separate component in the stack of the display assembly. The front light component 514 may reside atop or below the touch sensor component 506. In some instances, either the touch sensor component 506 or the front light component 514 is coupled to a top surface of a protective sheet 526 of the display 502. As one example, the front light component 514 may include a lightguide sheet and a light source (not illustrated in FIG. 5). The lightguide sheet may comprise a substrate (e.g., a transparent thermoplastic such as PMMA or other acrylic), a layer of lacquer and multiple grating elements formed in the layer of lacquer that function to propagate light from the light source towards the display 502, thus illuminating the display 502.

The cover layer component 516 may include a transparent substrate or sheet having an outer layer that functions to reduce at least one of glare or reflection of ambient light incident on the electronic device 500. In some instances, the cover layer component 516 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, the protective sheet 526 may include a similar UV-cured hard coating on the outer surface. The cover layer component 516 may couple to another component or to the protective sheet 526 of the display 502. The cover layer component 516 may, in some instances, also include a UV filter, a UV-absorbing dye, or the like, for protecting components lower in the stack from UV light incident on the electronic device 500. In still other examples, the cover layer component 516 may include a sheet of high-strength glass having an antiglare and/or antireflective coating.

The display 502 includes the protective sheet 526 overlying an image-displaying component 528. For example, the display 502 may be preassembled to have the protective sheet 526 as an outer surface on the upper or image-viewing side of the display 502. Accordingly, the protective sheet 526 may be integral with and may overlie the image-displaying component 528. The protective sheet 526 may be optically transparent to enable a user to view, through the protective sheet 526, an image presented on the image-displaying component 528 of the display 502.

In some examples, the protective sheet 526 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 526 may include a coating, such as the hard coating described above. For instance, the hard coating may be applied to the outer surface of the protective sheet 526 before or after assembly of the protective sheet 526 with the image-displaying component 528 of the display 502. In some examples, the hard coating may include a photoinitiator or other reactive species in its composition, such as for curing the hard coating on the protective sheet 526. Furthermore, in some examples, the protective sheet 526 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 526, thereby protecting the image-displaying component 528 from UV light.

According to some implementations herein, one or more of the components discussed above may be coupled to the display 502 using fluid optically-clear adhesive (LOCA). For example, suppose that the light guide portion of the front light component 514 is to be coupled to the display 502. The light guide may be coupled to the display 502 by placing the LOCA on the outer or upper surface of the protective sheet 526. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 514 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 514. In other implementations, the LOCA may be placed near a center of the protective sheet 526, and pressed outwards towards a perimeter of the top surface of the protective sheet 526 by placing the front light component 514 on top of the LOCA. The LOCA may then be cured by directing UV light through the front light component 514. As discussed above, and as discussed additionally below, various techniques, such as surface treatment of the protective sheet, may be used to prevent discoloration of the LOCA and/or the protective sheet 526.

While FIG. 5 illustrates a few example components, the electronic device 500 may have additional features or functionality. For example, the device 500 may also include additional data storage devices (removable and/or non-removable) such as, for example, magnetic disks, optical disks, or tape. The additional data storage media, which may reside in a control board (not illustrated), may include volatile and nonvolatile, removable and non-removable media implemented in any method or technology for storage of information, such as computer readable instructions, data structures, program modules, or other data. In addition, some or all of the functionality described as residing within the device 500 may reside remotely from the device 500 in some implementations. In these implementations, the device 500 may utilize the communication interfaces 518 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

The invention claimed is:

1. An electrowetting display comprising:
an electrowetting element comprising:
a hydrophobic layer portion;
an oil on the hydrophobic layer portion;
a first electrode; and
a thin film transistor (TFT) in electrical contact with the first electrode;
a second electrode;
a gate driver to provide signals to a gate of the TFT of the electrowetting element;
a source driver to provide signals to a source of the TFT of the electrowetting element to provide a data voltage at the first electrode of the electrowetting element;
a voltage generator to provide a common voltage to the second electrode; and
a timing controller to receive image data,
wherein the timing controller is configured to generate control signals, based upon the image data, to send to the voltage generator, the gate driver and the source driver to drive the electrowetting element with an initial driving voltage that comprises the data voltage and the common voltage, and
wherein the timing controller is configured to provide the control signals to the voltage generator to gradually increase an amplitude of the common voltage to a maximum in a range of four percent to six percent of a magnitude of the initial driving voltage.

2. The electrowetting display of claim 1, wherein the timing controller is configured to generate a reset control signal to cause a reset pulse via the gate driver to set a driving voltage of the electrowetting element to the common voltage, wherein the timing controller is configured to send the control signals to the voltage generator, the gate driver and the source driver after the reset pulse to readdress the electrowetting element with the initial driving voltage based upon the image data, and wherein the control signals sent to the voltage generator are configured to gradually increase the amplitude of the common voltage after the reset pulse.

3. The electrowetting display of claim 1, wherein the timing controller is configured to generate a reset control signal to cause a reset pulse via the gate driver to set a driving voltage of the electrowetting element to the common voltage, and wherein the timing controller is configured to generate:
a first control signal to send to the voltage generator to increase the amplitude of the common voltage prior to the reset pulse; and
a second control signal to send to the voltage generator to increase the amplitude of the common voltage after the reset pulse.

4. An electrowetting display comprising:
an electrowetting element comprising a first electrode;
a second electrode, wherein the electrowetting element is drivable using an initial driving voltage applied between the first electrode and the second electrode; and
a timing controller to provide control signals to:
(i) a thin film transistor coupled to the first electrode; and
(ii) a voltage generator coupled to the second electrode;
wherein the timing controller is configured to provide the control signals to the voltage generator to gradually increase an amplitude of a common voltage applied to the second electrode during driving of the electrowetting element, to gradually increase a magnitude of the initial driving voltage.

5. The electrowetting display of claim 4, wherein the timing controller is configured to generate:
a reset control signal to cause a reset pulse at the thin film transistor to set a driving voltage of the electrowetting element to the common voltage;
a first control signal to send to the voltage generator to increase the amplitude of the common voltage prior to application of the reset pulse to the thin film transistor; and
a second control signal to send to the voltage generator to increase the amplitude of the common voltage after application of the reset pulse to the thin film transistor.

6. The electrowetting display of claim 5, wherein the timing controller is configured to provide the first control signal and the second control signal to the voltage generator to increase the amplitude of the common voltage to a maximum in a range of 8 percent to 12 percent of the initial driving voltage.

7. The electrowetting display of claim 4, wherein the timing controller is configured to provide the control signals to the voltage generator to gradually increase the amplitude of the common voltage during readdressing of the electrowetting element.

8. The electrowetting display of claim 7, wherein the timing controller is configured to provide the control signals to the voltage generator to gradually increase the amplitude of the common voltage to a maximum in a range of 4 percent to 6 percent of the magnitude of the initial driving voltage.

9. The electrowetting display of claim 8, wherein the timing controller is configured to provide the control signals to the voltage generator to gradually increase the amplitude of the common voltage to a maximum of 5 percent of the magnitude of the initial driving voltage.

10. The electrowetting display of claim 7, wherein the timing controller is configured to generate:
a reset control signal to cause a reset pulse at the thin film transistor to set a driving voltage of the electrowetting element to the common voltage; and
a first control signal to send to the voltage generator to increase the amplitude of the common voltage at least one of: (i) prior to the reset pulse, or (ii) after the reset pulse.

11. The electrowetting display of claim 4, comprising:
a first fluid; and
a second fluid at least partially immiscible with the first fluid,
wherein the timing controller is configured to provide the control signals to the voltage generator to gradually increase the amplitude of the common voltage applied to the second electrode during the driving of the electrowetting element to compensate for a reduction in luminance of the electrowetting element due to backflow of the first fluid during the driving of the electrowetting element.

12. A method of driving an electrowetting display comprising a plurality of electrowetting elements, the method comprising:
based upon image data, providing control signals to selected electrowetting elements of the plurality of electrowetting elements;

based upon the control signals, driving the selected electrowetting elements with an initial driving voltage comprising a first voltage and a common voltage; and while driving the selected electrowetting elements, increasing an amplitude of the common voltage from a first amplitude at a first time to a second amplitude at a second time, to increase a magnitude of the initial driving voltage.

13. The method of claim 12, wherein the increasing the amplitude of the common voltage comprises increasing the amplitude of the common voltage at least one of: (i) prior to application of a reset pulse to the plurality of electrowetting elements, or (ii) after the application of the reset pulse to the plurality of electrowetting elements.

14. The method of claim 13, wherein the increasing the amplitude of the common voltage comprises increasing the amplitude of the common voltage to a maximum in a range of 8 percent to 12 percent of the magnitude of the initial driving voltage.

15. The method of claim 14, wherein the increasing the amplitude of the common voltage comprises increasing the amplitude of the common voltage to 10 percent of the magnitude of the initial driving voltage.

16. The method of claim 12, wherein the increasing the amplitude of the common voltage comprises gradually increasing the amplitude of the common voltage during readdressing of the selected electrowetting elements after application of a reset pulse to the plurality of electrowetting elements until just prior to application of a subsequent reset pulse to the plurality of electrowetting elements.

17. The method of claim 16, wherein the gradually increasing the amplitude of the common voltage comprises gradually increasing the amplitude of the common voltage to a maximum in a range of 4 percent to 6 percent of the magnitude of the initial driving voltage.

18. The method of claim 17, wherein the gradually increasing the amplitude of the common voltage comprises gradually increasing the amplitude of the common voltage to a maximum of 5 percent of the magnitude of the initial driving voltage.

19. The method of claim 16, wherein the increasing the amplitude of the common voltage further comprises increasing the amplitude of the common voltage at least one of: (i) prior to application of a reset pulse to the plurality of electrowetting elements, or (ii) after the application of the reset pulse to the plurality of electrowetting elements.

20. The method of claim 19, wherein the increasing the amplitude of the common voltage further comprises both increasing the amplitude of the common voltage (i) prior to the application of the reset pulse to the plurality of electrowetting elements and (ii) after the application of the reset pulse to the plurality of electrowetting elements.

* * * * *